(12) United States Patent
Fujiwara et al.

(10) Patent No.: US 6,404,477 B1
(45) Date of Patent: Jun. 11, 2002

(54) LIQUID CRYSTAL DISPLAY APPARATUS

(75) Inventors: Kouji Fujiwara, Tenri; Tomohiko Yamamoto, Nara; Keiichi Tanaka, Tenri; Naoto Inoue; Hideki Ichioka, both of Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/560,961

(22) Filed: Apr. 28, 2000

(30) Foreign Application Priority Data

Apr. 30, 1999 (JP) ............................................ 11-124941
Jan. 26, 2000 (JP) ............................................ 12-017305

(51) Int. Cl.7 ........................................... G02F 1/1345
(52) U.S. Cl. ........................... 349/149; 349/42; 349/43
(58) Field of Search ........................... 349/149, 42, 43, 349/49

(56) References Cited

U.S. PATENT DOCUMENTS

| 4,678,282 A | * | 7/1987 | Yaniv et al. ................. 349/43 |
| 4,694,287 A | | 9/1987 | Chenevas-Paule et al. |
| 4,869,576 A | * | 9/1989 | Aoki et al. ................. 349/106 |

FOREIGN PATENT DOCUMENTS

| JP | 3-72321 A | 3/1991 |
| JP | 9-54330 | 2/1997 |
| JP | 11-311807 A | 11/1999 |

* cited by examiner

Primary Examiner—Toan Ton
Assistant Examiner—David Chung
(74) Attorney, Agent, or Firm—Nixon & Vanderhye, P. C.

(57) ABSTRACT

An object of the present invention is to provide an active matrix type liquid crystal display apparatus, capable of being upsized and having enhanced resolution at low cost without being degraded in display quality. In the liquid crystal display apparatus, on a pixel substrate, scanning lines and reference signal lines are formed in a row direction, and on a counter substrate, gradation signal lines are formed in a column direction. A liquid crystal layer is sandwiched between the pixel substrate and the counter substrate. Outside an image display region, a reference signal transfer pad is disposed on the counter substrate opposite to a main reference signal line for connecting end portions of reference signal lines. The reference signal transfer pad and the main reference signal line are electrically connected by conductive material.

5 Claims, 13 Drawing Sheets

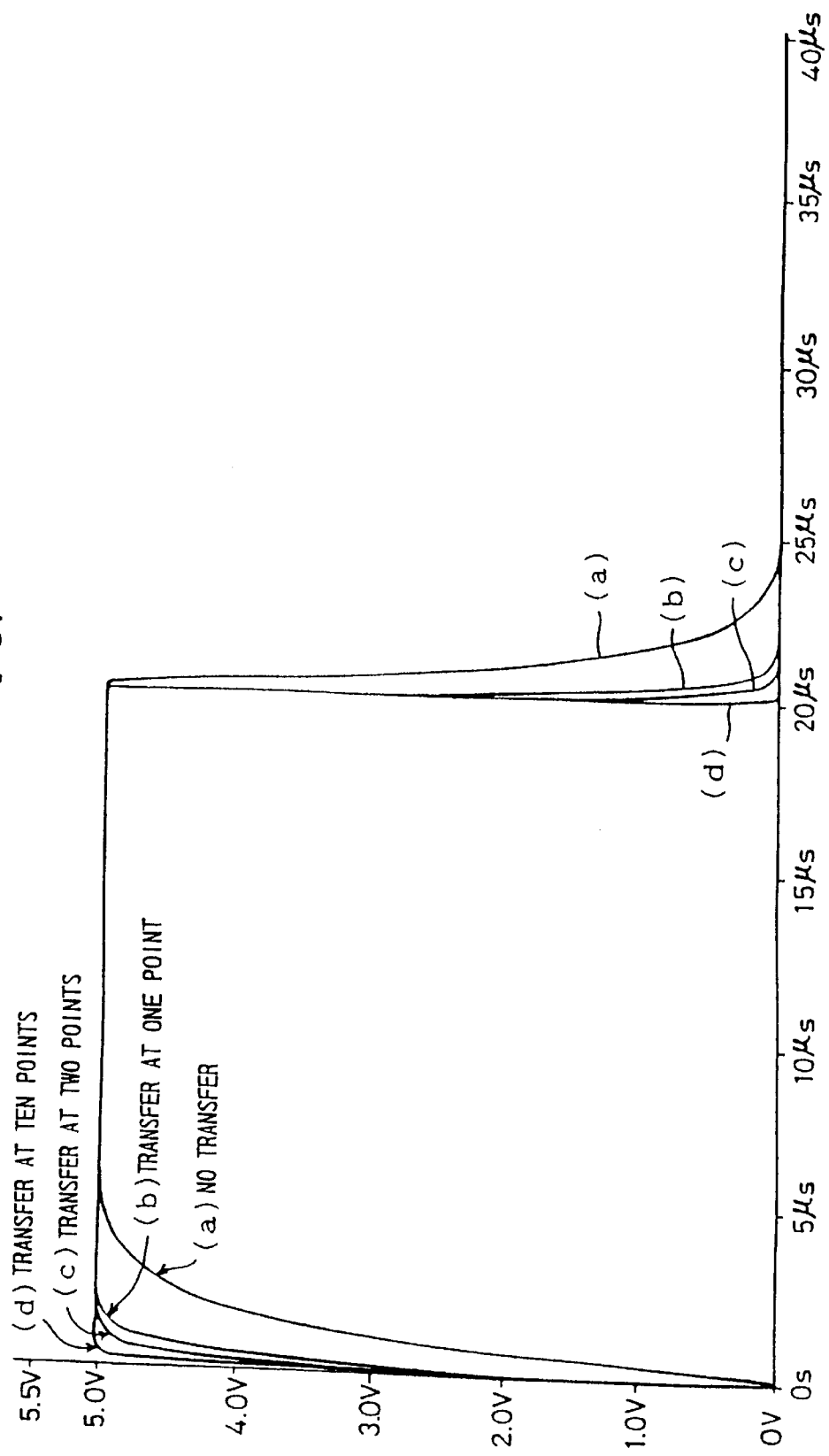

LIQUID CRYSTAL DISPLAY APPARATUS

BACKGROUND OF THE INVENTION

1. Field of the Invention

The present invention relates to a liquid crystal display apparatus, in particular to an active matrix type liquid crystal display apparatus in which switching elements are arranged in a matrix form on a substrate.

2. Description of the Related Art

Conventionally, a liquid crystal display apparatus using a nematic liquid crystal is widely used for segment type liquid PC; crystal display apparatuses such as watches or calculators. Recently, taking advantages of its reduced size in thickness, light weight and low power consumption, the liquid crystal display apparatus is widely used for any kind of display device of word processors, computers, navigation systems or the like. In particular an active matrix type liquid crystal display apparatus has been widely used, in which an active element such as a thin film transistor (hereinafter referred to as TFT) is used as a switching element and pixels are arranged in a matrix form.

A liquid crystal display apparatus, in comparison with CRT (cathode ray tube) conventionally used as a display, has advantages of remarkably reduced thickness (depth), low power consumption and ease of full color display, and is in increasing demand in a variety of fields including personal computers, monitors, mobile televisions and camera display devices.

FIG. 16 is a view showing a schematic structure of a conventional active matrix type liquid crystal display apparatus. The liquid crystal display apparatus is transparent type and has a light-transmitting active matrix substrate on which a plurality of pixel electrodes 101 for applying a voltage to a liquid crystal layer are formed in a matrix form. As a switching element for selectively driving pixel electrodes 101, a TFT 102 is formed on the active matrix substrate, whose drain terminal is connected to a pixel electrode 101. Furthermore, in order to display in color, on the active matrix substrate or on a counter substrate are provided color filter layers such as red, green and blue.

To a gate terminals of the TFT 102 is connected a scanning line 103. In addition, a gradation signal line 104 is connected to a source terminal. The scanning line 103 and the gradation signal line 104 are arranged so as to pass the periphery of the pixel electrode 101 and intersect at right angles each other. When a signal is inputted via the scanning line 103,to the gate terminal, the TFT 102 is driven and controlled. When an input signal is inputted to obtain continuity between the source terminal and the drain terminal, a data signal supplied via a gradation signal line 104 is inputted as a display signal to the pixel electrode 101.

To the drain terminal of the TFT 102 is connected one terminal of an additive capacitance 105 in conjunction with pixel electrodes 101. The other terminal of the additive capacitance 105 is connected to a common signal line 106 and the additive capacitance 105 plays a role for keeping a voltage applied to a liquid crystal layer. Since the capacitance of the additive capacitance 105 Cs causes a signal delay, in order to reduce the signal delay a connecting line 107 for connecting common signal lines 106 can be provided. The inventors of the invention disclose the connecting line 107 which connects the common signal lines 106 in Japanese Unexamined Patent Publication JP-A 3-72321 (1991).

In Japanese Unexamined Patent Publication JP-A 3-72321 (1991), common main wirings for electrically connecting between storage capacitance (Cs) bus lines are provided at both ends of the Cs bus lines, whereby the signal delay is reduced and high image quality can be obtained.

In the active matrix type liquid crystal display apparatus, a liquid crystal layer having a thickness of 4.3 to 4.5 $\mu$m in general is sandwiched between an active matrix substrate and an opposite counter substrate to form a liquid crystal capacitance 108. The additive capacitance 105 is connected to the liquid crystal capacitance 108 in parallel. However, the conventional structure as shown in FIG. 16 has problems such as increasing possibility of occurrence of failure, decreasing yield and increasing manufacturing costs because there is a intersection part between the scanning line 103 and the gradation signal line 104. Furthermore, with the conventional structure a capacitance is formed in the intersection part of signal lines via an insulating film, and a signal delay such as a common signal delay occurs, which may reduce display quality of a liquid crystal display apparatus.

FIG. 17 is a view showing a schematic configuration of a liquid crystal display apparatus having a counter source structure which is proposed in U.S. Pat. No. 4,694,287. Since in this structure on the TFT substrate side there is no intersection part of signal lines, a leak between signal lines hardly occurs and since intersection parts are -not on the same substrate, a capacitance added to signal lines can be reduced. In the case of the counter source structure, on the pixel substrate on which pixel electrodes are formed, scanning lines and gradation signal lines, which are formed on the different substrate, do not intersect, whereby reduction of the probability of occurrence of line failure, enhancement of yield and reduction of manufacturing costs can be realized. In addition, in the case of the counter source structure, there is no intersection of signal lines on the same substrate, therefore no capacitance is formed in the intersection part. Accordingly, in comparison with the conventional structure as shown in FIG. 16, the capacitance added to signal lines and the signal delay can be reduced.

In the counter source structure as shown in FIG. 17, on the pixel substrate 110 are arranged switching elements 111 with three terminals such as amorphous silicon semiconductors are arranged in a matrix form to form an active matrix. The switching element 111 is, for example, a TFT, to a gate terminal of which is connected a scanning line 112 for each of columns of switching element, and to a source terminal of which is connected a reference signal line 113 for each of the columns of switching elements, and to a drain terminals of which is connected a pixel electrode 114. On a counter substrate 115 opposite to a pixel substrate are arranged a plurality of gradation signal lines 116 in a direction orthogonal to the scanning line 112. The gradation signal line 116 also serves as a counter electrode in an opposite part to the pixel electrodes 114.

The liquid crystal display apparatus, taking advantages of reduced thickness, light weight and low power consumption, is widely used for any kind of display devices such as televisions, computers and navigation systems. Demand for upsizing of display and high resolution of panels is increasing through the years. In order to achieve an upsized high resolution panel, it is necessary to solve a problem of signal delay, which is one of the biggest problems to be solved. With the upsizing of the panel, the signal line will be longer and the resistance value of the signal line and the capacitance value added to the signal line will increase. Since the extent of signal delay is proportional to the product of resistance value and capacitance value, upsizing of panels involving increases of both the resistance value and the capacitance value, causes a greater signal delay. As a result, within writing time a desired voltage can not be applied to a part of liquid crystal, which causes degradation in display quality, so-called shadowing.

Similarly, in enhancing the resolution, the signal writing time is also reduced and an effect of signal delay will appear strongly. Consequently, the same as in the case of upsizing the panel, degradation in display quality will occur.

Moreover, in the case of upsizing the display panel and enhancing the resolution, the following is unavoidable:

1) the resistance value of the signal line is increased;
2) the capacitance added to the signal line is increased; and
3) the writing time is reduced.

Therefore it is difficult to solve the problem of signal delay under such conditions.

In order to decrease the signal delay, the following solutions are considered:

1) to increase the thickness of a laminated metal film which forms the signal line in order to reduce the signal line resistance;
2) to increase the width of the signal line in order to reduce the resistance of the signal line; and
3) to increase the distance between the signal lines to reduce the capacitance added to the signal lines in the case of a counter source structure.

The solution 1), however, causes longer film producing time, namely reduction in manufacturing capacity, because the laminated metal film is thicker than the conventional film. Additionally, control of patterning process by etching will be more difficult, and as well degradation in quality of the liquid crystal display apparatus and increase in manufacturing costs are caused. With regard to the solutions 2) and 3), by increasing the width of the signal line or the distance between the signal lines, the area of pixel electrode will be decreased and accordingly the opening rate of a liquid crystal panel is reduced. With the reduction of the opening rate, the brightness of the liquid crystal panel as a display panel will be reduced and display quality is degraded. Therefore, these solutions cause adverse effects such as yield reduction, degradation in display quality due to the opening rate reduction and increase of manufacturing costs.

In particular, with the conventional structure as shown in FIG. 16, in the intersection part of signal lines via an insulating film, a capacitance is formed and accordingly a capacitance added to the signal line will be increased. As a result, the signal delay will be longer, and accordingly the signal delay which is caused in upsizing of liquid crystal display panel and increasing of resolution, will become a very serious problem. In a liquid crystal display apparatus of a counter source structure as shown in FIG. 17, there is no intersection part of signal lines on the same substrate whereby the capacitance added to signal lines can be reduced in comparison with the case of a conventional structure, and the signal delay can be suppressed. However, with upsizing of liquid crystal panel and increasing of resolution, it will become very difficult to manufacture without degradation in display quality and increase of manufacturing costs.

In an upsized liquid crystal display panel of high resolution, it is difficult to suppress the signal delay only by electrical connection at both ends of the Cs bus line, as disclosed in Japanese Unexamined Patent Publication JP-A 3-72321 (1991). As prior art in, even if a counter source structure is employed to avoid an occurrence of leakage between signal lines or reduce the additive capacitance, as shown in U.S. Pat. No. 4,694,287, the degradation of display quality can not be suppressed, which is caused by a signal delay with upsizing the liquid crystal display panel and enhancing the resolution.

The applicant proposes a liquid crystal display apparatus in Japanese Unexamined Patent Publication JP-A 11-311807 (1999), comprising a counter source structure without horizontal shadowing and with high display quality. In the liquid crystal display apparatus proposed in Japanese Unexamined Patent Publication JP-A 11-311807 (1999), a plurality of reference signal lines are interconnected via the first connecting line. And a plurality of reference signal lines are also connected to input terminals of reference signals via two drawing lines connected to the first connecting lines. The first connecting line and both drawing lines are arranged on the substrate outside from an image display region in which pixel electrodes are formed. In the liquid crystal display apparatus, reference signals can be inputted only from input terminals on the substrate on which pixel electrodes are formed.

SUMMARY OF THE INVENTION

An object of the present invention is to provide a liquid crystal display apparatus, which realizes enhancement of display quality at low cost regardless of an upsizing and high resolution realization.

The invention provides a liquid crystal display apparatus comprising:

a pixel substrate;

a counter substrate disposed opposite to the pixel substrate; and a liquid crystal layer sandwiched therebetween, the pixel substrate comprising thereon:

a plurality of switching elements provided with a control terminal and first and second controlled terminals, a conductive state between the first and second controlled terminals, being controlled according to a signal inputted to the control terminal, the plurality of switching elements being arranged in a matrix form;

a plurality of scanning lines for connecting the control terminals of the respective switching elements for each row thereof;

a plurality of reference signal lines for connect the first controlled terminals of the switching elements for each row thereof; and a plurality of pixel electrodes which are connected to the second controlled terminals of the switching elements, the counter substrate comprising thereon:

a plurality of counter electrodes, which are disposed opposite to respective pixel electrodes; and a plurality of signal lines for connecting the counter electrodes for each column thereof, the liquid crystal display apparatus further comprising:

a pixel side connecting region which is formed on the pixel substrate and is connected to the plurality of reference signal lines;

a counter side connecting region which is formed on the counter substrate so as to oppose to the pixel side connecting region; and conductive material for electrically connecting between the pixel side connecting region and the counter side connecting region.

According to the invention, the liquid crystal display apparatus is formed in which the liquid crystal layer is sandwiched between the pixel substrate and the counter substrate. On the pixel substrate, the plurality of switching elements, the plurality of scanning lines, the plurality of reference signal lines, and the plurality of pixel electrodes are provided. On the counter substrate, the plurality of counter electrodes and the plurality of signal lines are provided. On the pixel substrate, the pixel side connecting region is formed which is connected to the plurality of reference signal lines. On the counter substrate, the counter side connecting region is formed so as to oppose to the pixel side connecting region. Since between the pixel side connecting region and the counter side connecting region are electrically connected by conductive material, the signal delay can be reduced. In addition, since on the pixel substrate, the scanning lines and reference signal lines are respectively formed in a row direction, there is no intersection part on the pixel substrate, and the gradation signal lines which intersect scanning lines at right angles in a column direction, can be formed on the counter substrate, whereby reduction of the probability of line failure occurrence and enhancement of yield can be achieved, with the result that manufacturing costs can be reduced.

As mentioned above, according to the invention, the scanning lines and the gradation signal lines do not intersect each other on the pixel substrate because the scanning lines and the gradation signal lines are respectively formed on different substrates, namely, on the pixel substrate and the counter substrate. Accordingly reduction of the probability of line failure occurrence and enhancement of yield can be achieved, with the result that manufacturing costs can be reduced. Furthermore, since a reference signal can be inputted from the counter substrate side via conductive material to the reference signal lines on the pixel substrate, it is possible to reduce the reference signal delay, prevent shadowing due to a signal delay and enhance display quality. With this structure, without changing wiring material for forming signal lines in the display region, and the thickness and width of the signal lines, the signal delay can be reduced, and therefore without reducing the opening rate and reference signal delay, enhancement of display quality can be realized. In addition, since the reference signal delay can be reduced, it is possible to reduce the width of the reference signal line and increase the opening rate to further enhance the display quality. It is also possible to reduce the film thickness and manufacturing costs of the liquid crystal display apparatus to increase productivity.

In the invention it is preferable that the pixel substrate comprises a main reference signal line for connecting the plurality of reference signal lines, disposed outside a region where the plurality of pixel electrodes are arranged, and the pixel side connecting region is formed on the main reference signal line.

According to the invention, since the main reference signal line for connecting between the plurality of reference signal lines are disposed outside the region of the pixel substrate where the pixel electrodes are arranged, and the pixel side connecting region is formed on the main reference signal line, it is possible to increase the area of the pixel side connecting region, and reduce the resistance value and signal delay. Further, in the case where the signal delay in the pixel side connecting region is reduced, it is also possible to reduce the width of the reference signal line and increase the opening rate in the region where the pixel electrodes are arranged, to enhance display quality. Additionally, it is also possible to decrease the film thickness of the reference signal line to increase productivity, with the result that the price of the liquid crystal display panel is reduced.

As mentioned above, according to the invention, since the pixel side connecting region is provided on the main reference signal line disposed in the region of the pixel substrate where the pixel electrodes are formed, by increasing the width of the main reference signal line or the film thickness, an electrical resistance and signal delay can be reduced.

In the invention it is preferable that the combination of the pixel side connecting region, the counter side connecting region and the conductive material is formed at a plurality of points.

According to the invention, since the electrical connection to the reference signal lines are made at a plurality of points, the signal delay can be reduced. As mentioned above, according to the invention, the electrical connection from the counter substrate to the reference signal lines is made at a plurality of points, the signal delay of the reference signal which is inputted to the reference signal line can be further reduced, shadowing due to the signal delay can be prevented, with the result that display quality can be enhanced.

In the invention it is preferable that a plurality of pieces of the conductive material are arranged for a single combination of the pixel side connecting region and the counter side connecting region.

According to the invention, since the plurality of pieces of the conductive material are used for connection between the pixel side connecting region and the counter side connecting region, even if a poor electrical connection occurs in any one of the pieces of the conductive material, the other pieced can ensure the electrical connection, and reliability thereof can be improved. As mentioned above, according to the invention, since the plurality of pieces of the conductive material are used for connection between the pixel side connecting region and the counter side connecting region, the reliability of the electrical connection can be improved and the electrical resistance and signal delay can be reduced.

In the invention it is preferable that the liquid crystal display apparatus further comprises a control substrate, which is connected to the counter side connecting region, for inputting the reference signal to the reference signal lines via the conductive material and the pixel side connecting region.

According to the invention, the reference signal can be inputted with a reduced delay time from the control substrate via the counter side connecting region to the reference signal lines on the pixel substrate, and therefore the signal delay can be suppressed with the result that display quality can be improved. As mentioned above, according to the invention, the reference signal can be inputted with a reduced delay time from the control substrate to the reference signal lines, with the result that display quality can be improved.

BRIEF DESCRIPTION OF THE DRAWINGS

Other and further objects, features, and advantages of the invention will be more explicit from the following detailed description taken with reference to the drawings wherein:

FIG. 7 is a graph showing signal delay status of simulation results about models of FIGS. 6A to 6C;

DETAILED DESCRIPTION OF THE PREFERRED EMBODIMENTS

Figure 1:
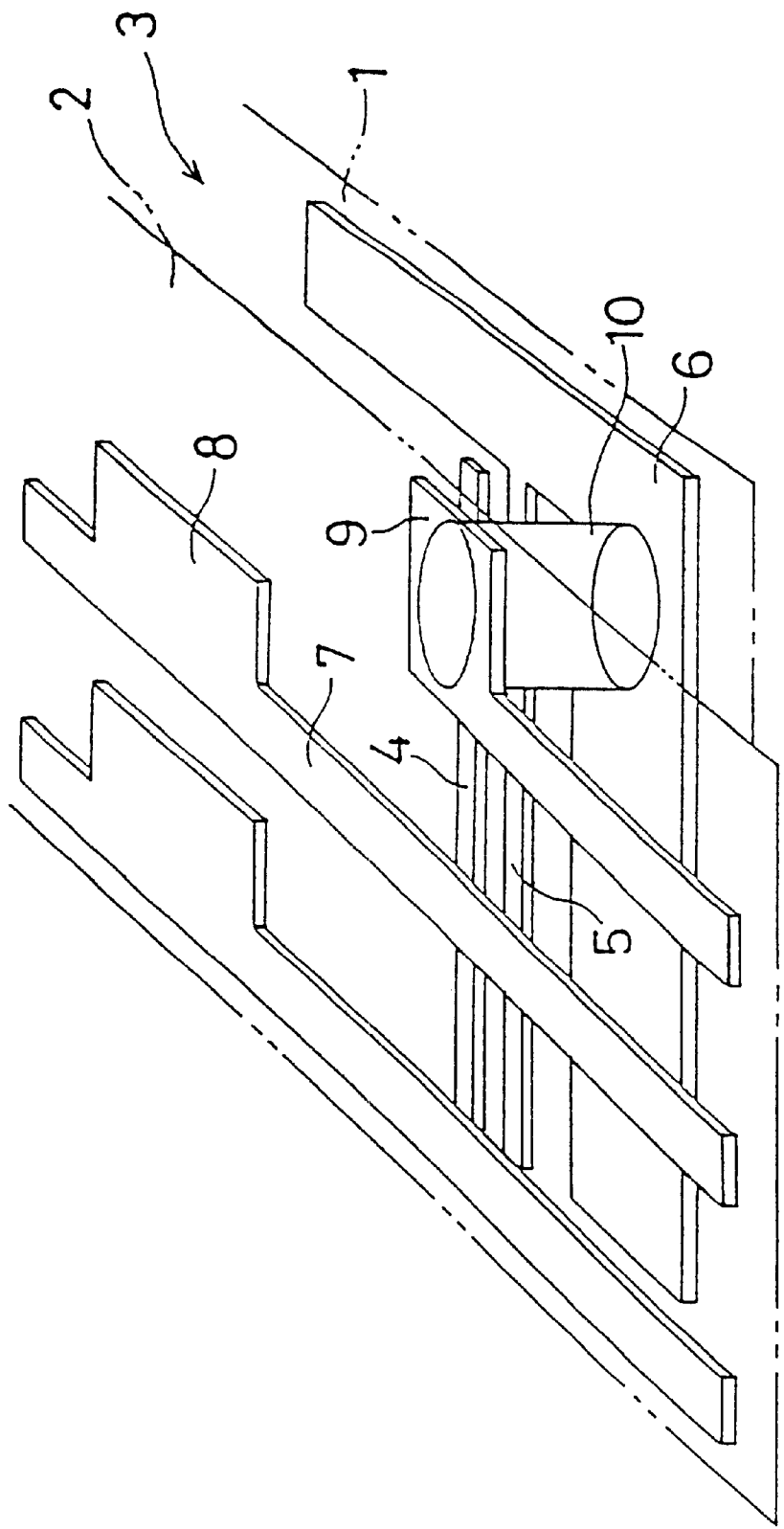
FIG. 1 is a partial perspective view showing the schematic configuration of a liquid crystal display apparatus of a first embodiment.

Now referring to the drawings, preferred embodiments of the invention are described below.

Figure 16:
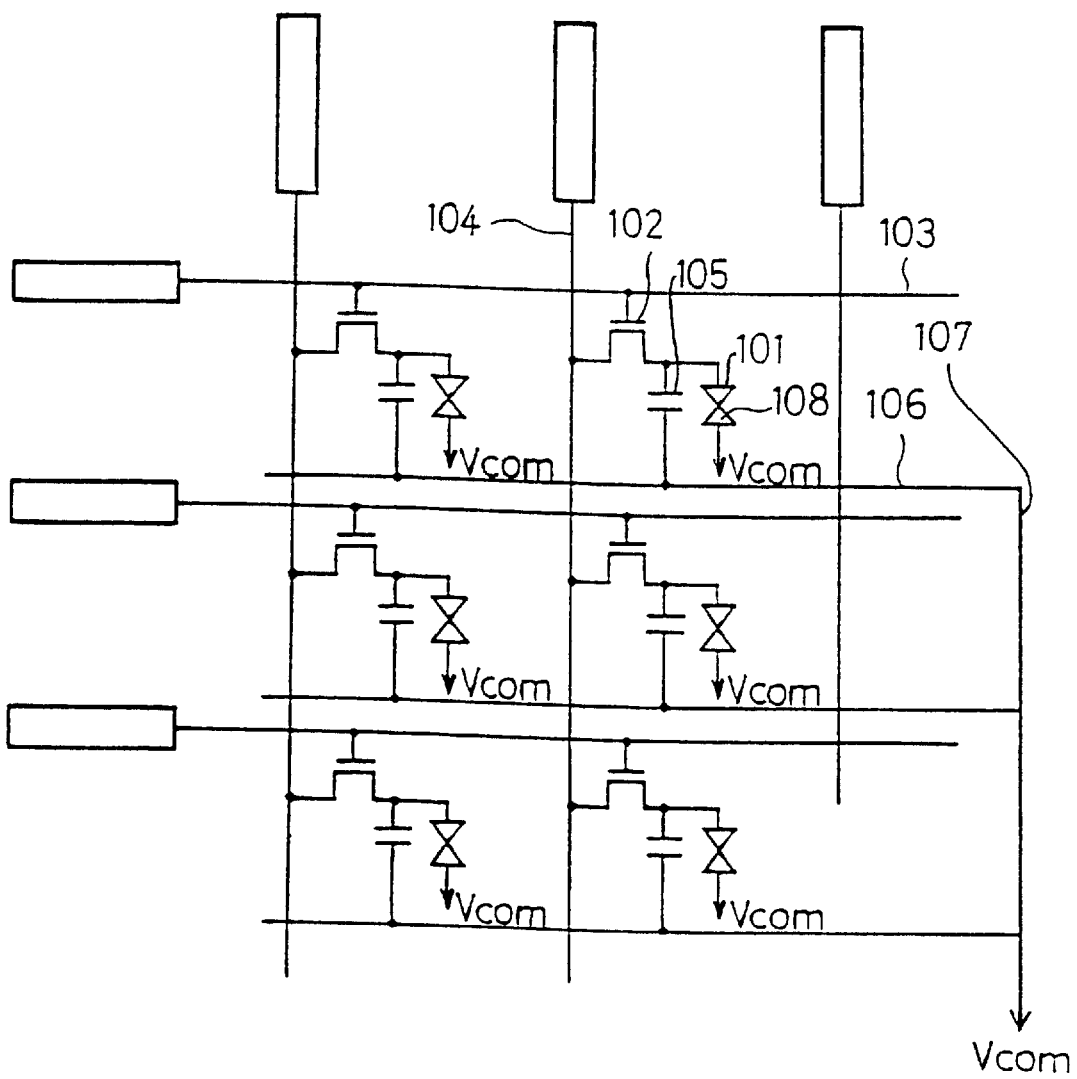
FIG. 16 is an equivalent electrical circuit diagram of a conventional liquid crystal display apparatus.
Figure 17:
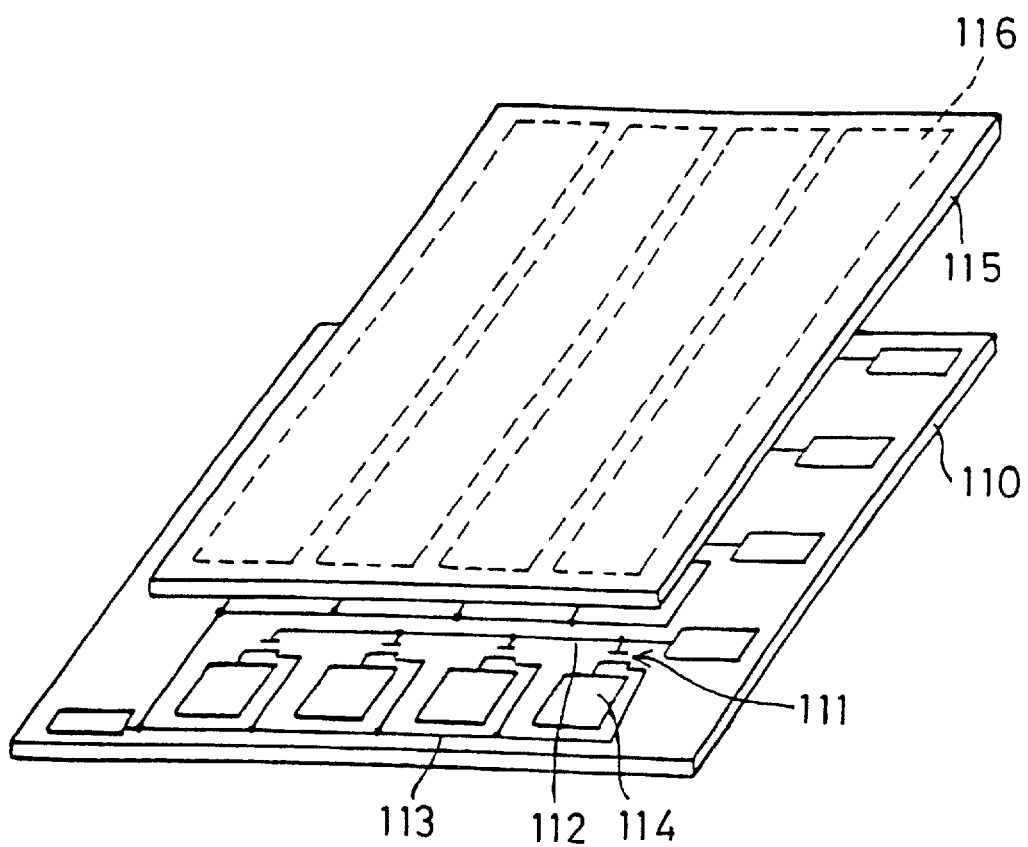
FIG. 17 is a partial perspective view of a conventional liquid crystal display apparatus having a counter source structure.

In the respective drawings, parts corresponding to ones which have been already explained in FIGS. 16 and 17, are denoted by the same reference numerals and overlapped explanations are omitted. It is to be understood that the invention is not limited to the following embodiments. In the respective embodiments transparent type liquid crystal display apparatuses are described, however, the invention is similarly applicable to reflection type liquid crystal display apparatuses.

Figure 2:
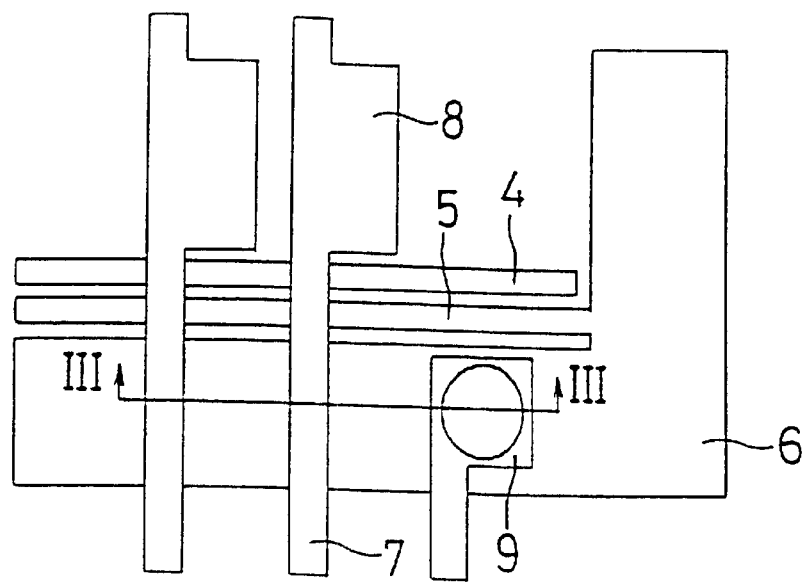
FIG. 2 is a partial plan view of the liquid crystal display apparatus of FIG. 1.
Figure 3:
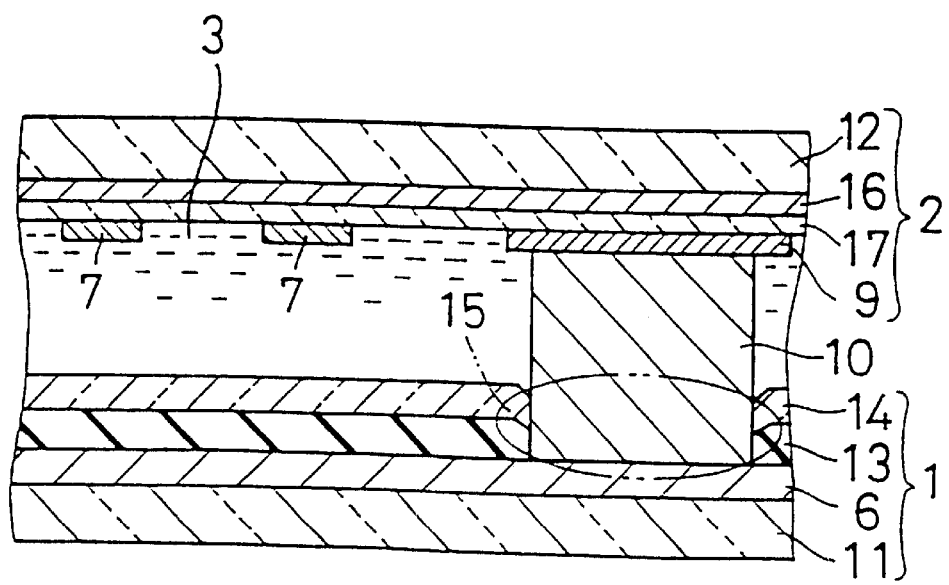
FIG. 3 is a sectional view of the liquid crystal display apparatus of the FIG. 1 taken along line III—III of FIG. 2.
Figure 4:
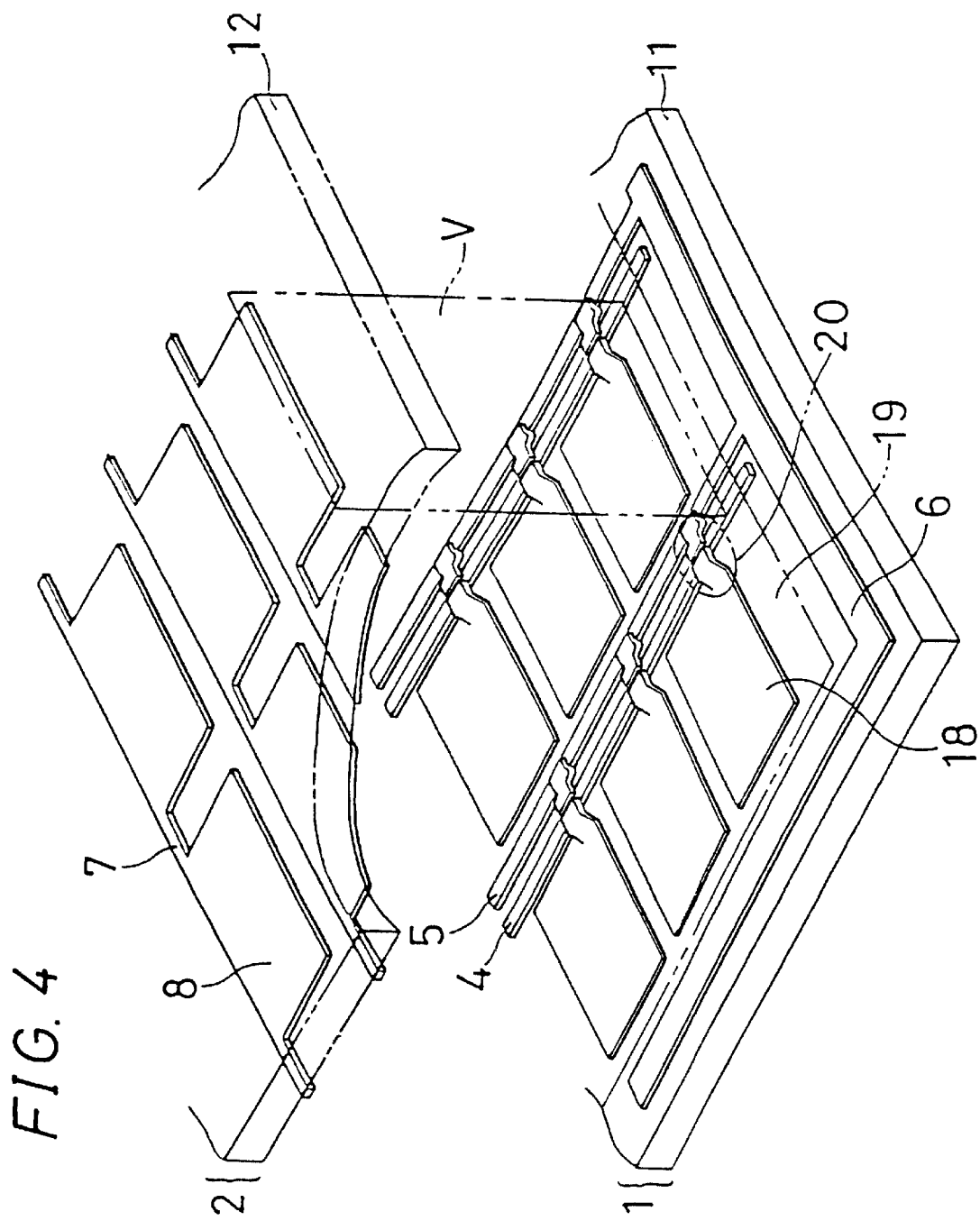
FIG. 4 is a partial perspective view showing the structure of pixels, related to display, in the liquid crystal display apparatus of FIG. 1.
Figure 5:
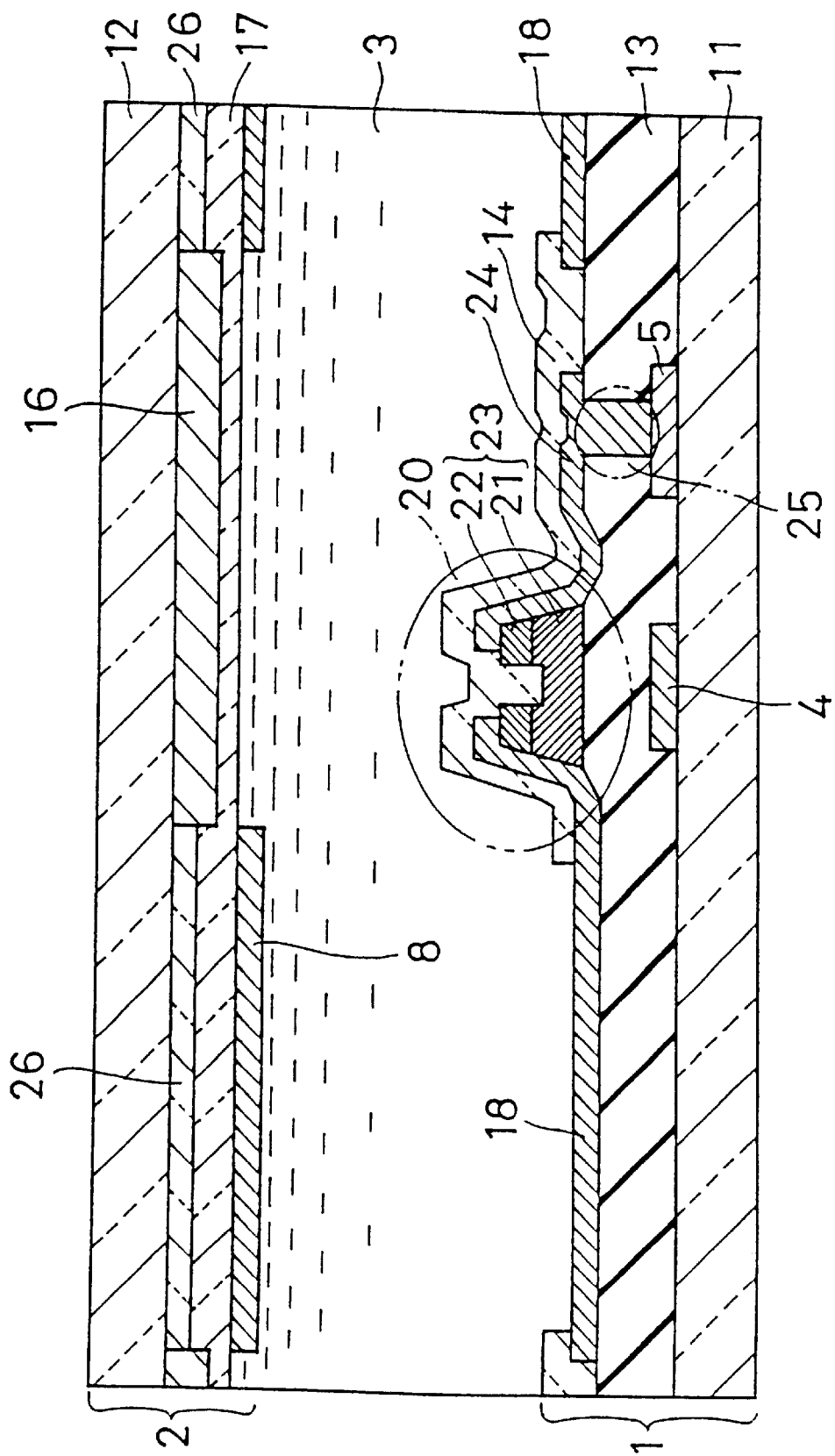
FIG. 5 is a partial sectional view of the liquid crystal display apparatus of FIG. 1 which is indicated by V of FIG. 4.

FIGS. 1 to 5 are schematic configurations of a liquid crystal display apparatus of a first embodiment of the invention. FIGS. 1 and 2 are a perspective view and a plan view, respectively, showing characteristic parts of the invention. FIG. 3 is a sectional view taken along line III—III of FIG. 2. FIG. 4 is a view showing an active matrix form in a counter source structure. FIG. 5 is a view showing a sectional structure of the part which is indicated by a reference sign V in FIG. 4. As shown in FIGS. 1 and 2, a liquid crystal display apparatus comprises a pixel substrate part 1, a counter substrate part 2 spaced from the pixel substrate part 1 and a liquid crystal layer 3 sandwiched therebetween. In the pixel substrate part 1, a plurality of scanning lines 4 and reference signal lines 5 are formed in parallel to each other to extend in a row direction. An end of each of the reference signal lines 5 is connected to a main reference signal line 6 which serves as an pixel side connecting region. In connection with the counter substrate part 2, a plurality of gradation signal lines 7 are formed to extend in a column direction which signal lines intersect the scanning lines 4 and reference signal lines 5. For the gradation signal lines 7, counter electrodes 8 are formed so as to oppose to pixel electrodes of the pixel substrate part 1. In the counter substrate part 2, in conjunction with the gradation signal lines 7, a reference signal transfer pad 9 is also formed as a counter side connecting region. The reference signal transfer pad 9 is connected to the main reference signal line 6 as the pixel side connecting region of the pixel substrate part 1 via a conductive material 10.

As shown in FIG. 3, the pixel substrate part 1 and the counter substrate part 2 comprise insulating transparent substrates 11, 12 such as glass, respectively. The surface of the pixel substrate part 1 is coated with a gate insulating film 13 and a protection film 14. In order to make an electrical connection by the conductive material 10, the gate insulating film 13 and the protection film 14 are partly removed to form a hole 15. In connection with the counter substrate part 2, on a black matrix layer 16 and an overcoat layer 17 are formed the gradation signal lines 7 and the reference signal transfer pad 9 which serves as the counter side connecting region, and the conductive material 10 is interposed between the reference signal transfer pad 9 and the hole 15 to make an electrical connection.

Display in pixels of the liquid crystal display apparatus is carried out by inputting scanning signals to the scanning lines 4, reference signals to the reference signal lines 5 and gradation signals to the gradation signal lines 7. In the embodiment, in order to input the reference signals from the counter substrate part 2 side, the reference signal transfer pad 9 is provided on the counter substrate part 2 side, and the reference signals can be inputted to the reference signal transfer pad 9. In order to transmit inputted reference signals to the reference signal lines 5 of the pixel substrate part 1, the conductive material 10 is arranged. As the conductive material 10 which gives continuity between the reference signal transfer pad 9 and the main reference signal line 6 can be used carbon paste, silver paste, gold paste and the like.

As shown in FIG. 4, in connection with the pixel substrate part 1, a plurality of pixel electrodes 18 are arranged in a matrix form on an insulating transparent substrate 11 to form an image display region 19. One of controlled terminals of a switching element 20 of three terminals such as an amorphous silicon (hereinafter referred to as a-Si) semiconductor is connected to the pixel electrode 18. When the switching elements 20 is a TFT, a drain terminal is connected to the pixel electrode 18. The scanning line 4 of each row is connected to a control terminal of the switching element 20, for example, to a TFT gate terminal. The reference signal line 5 of each row is connected to the other controlled terminal of the switching element 20, for example, a TFT source terminal. The main reference signal line 6 is formed outside the image display region 19 so as to connect all reference signal lines 5 of the respective rows. Each of the pixel electrodes 18 is formed so as to oppose to each of the counter electrodes 8 of the counter a substrate part 2.

As shown in FIG. 5 as a sectional view of V section in FIG. 4, in connection with the pixel substrate part 1, for example, tantalum (Ta) having a thickness of about 3000 Å is laminated on the insulating transparent substrate 11 by a sputtering process and thereafter patterned to form the scanning lines 4 and the reference signal lines 5. Aluminum (Al), copper (Cu), aluminum alloy or the like can be used in stead of tantalum. Subsequently, a gate insulating film 13 is formed by laminating SiNx having a thickness of about 2000 to 4000 Å by a plasma CVD process, and next by laminating an a-Si layer 21 having a thickness of about 1500 Å by a plasma CVD process, further by laminating an n+a-Si layer 22 having a thickness of about 400 Å. The a-Si layer 21 and the n+a-Si layer 22 form a channel 23. After a patterning process is carried out to the channel 23, a hole 15 as shown in FIG. 3 is formed in the gate insulating film 13 by an etching process. Then transparent electrode material such as ITO (Indium Tin Oxide) is laminated by a sputtering process or the like and patterned to form the pixel electrodes 18 and the source connecting lines 24 having a thickness of about 1000 to 1500 Å. At this time, hole connecting parts 25 are formed for connecting the reference signal lines 5 and the source terminals 25 as the other controlled terminal of the switching elements 20 via the source connecting lines 24. Furthermore, a SiNx layer having a thickness of about 2000 Å is laminated by a plasma CVD, and patterned to form the protection film 14.

In connection with the counter substrate part 2, on the pixel substrate part 1 side surface of the insulating transparent substrate 12 are formed a color filter layer 26 and a black matrix layer 16. On the pixel substrate part 1 side surface of the color filter layer 26 and black matrix layer 16 is further formed an overcoat layer 17 as a film for flattening. On the picture substrate part 1 side surface of the overcoat layer 17 are arranged a plurality of the gradation signal lines 7 as shown in FIG. 4 in the column direction intersecting the scanning line 4 at right angles. In a portion where the gradation signal lines 7 oppose to the pixel electrodes 18, the counter electrodes 8 are arranged.

Figure 6A:
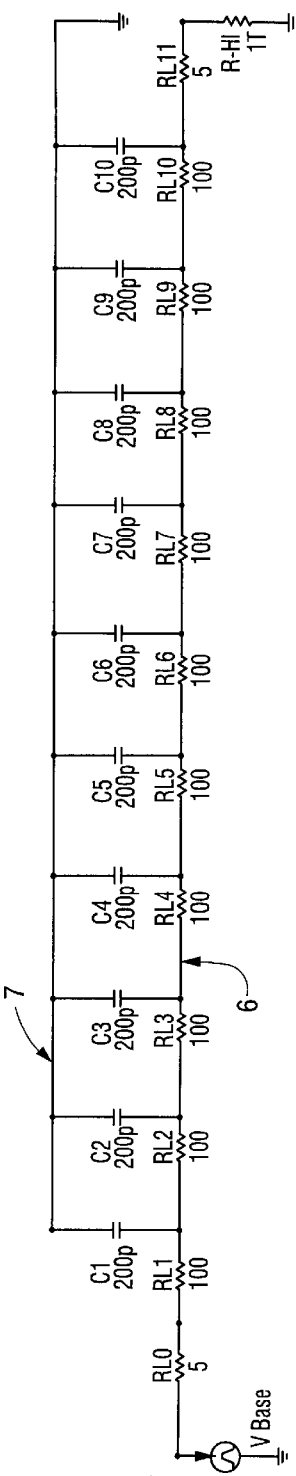
FIGS. 6A to 6C are electric circuit diagrams showing simulation models about reference signal delays in the liquid crystal display apparatus.
Figure 6B:
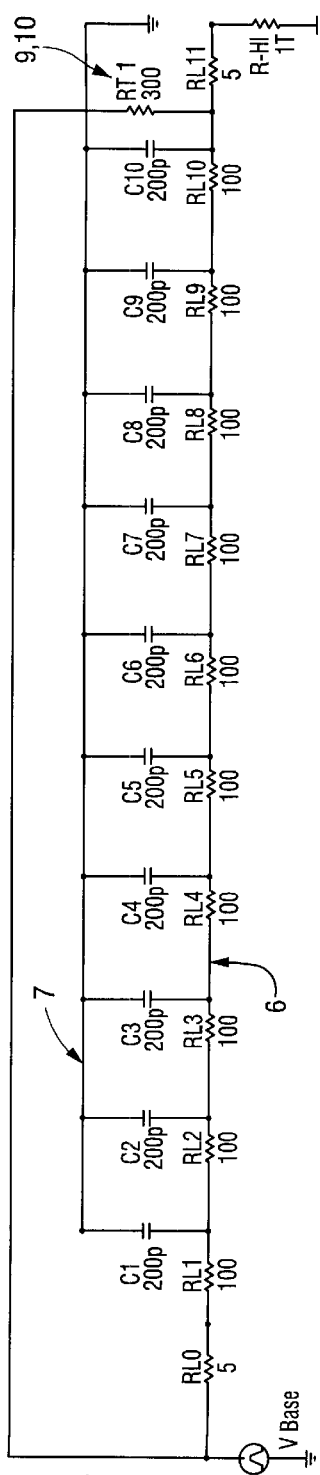
Figure 6C:
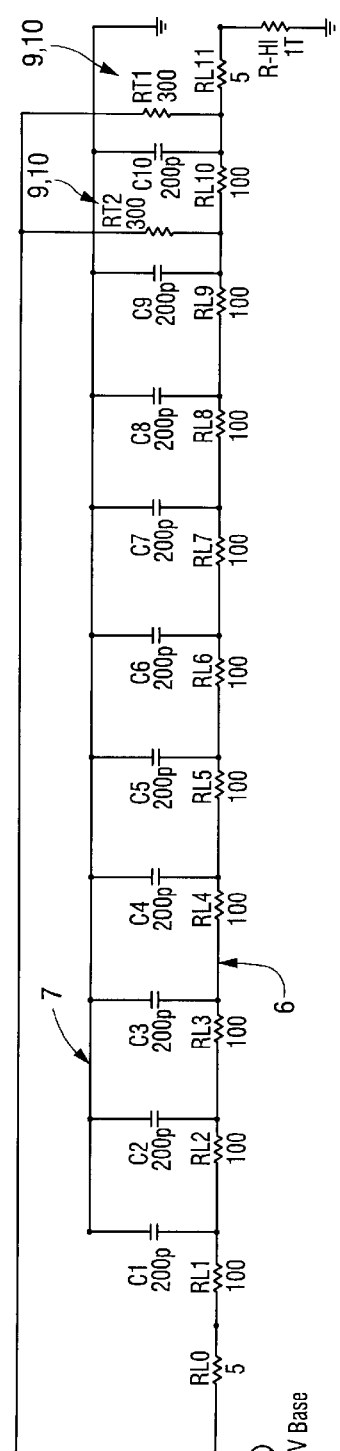

FIGS. 6A to 6C are views showing models which are used for simulations for specifically showing the extent of signal delay reduction effect in the embodiment. The resistance value and capacitance value of the models which are used for simulations, are set as follows.

Resistance value

Resistance value of the main reference signal line 6: $1000(\Omega)$=RL1 + . . . +RL10 (specific resistance: $\rho$=25 $\mu\Omega$·cm (Ta film); signal line length: 300 mm; signal line width: 0.5 mm; film thickness: 150 nm)

Resistance value of the conductive material 10: $50(\Omega)$ (carbon past)

Resistance value of the reference signal transfer pad 9: $250(\Omega)$ (specific resistance: $\rho$=200$\mu\Omega$·cm (ITO film); signal line length : 1.5 mm; signal line width: 80 $\mu$m; film thickness: 150 nm)

Capacitance value: Sum of coupling capacitances of the main reference signal line 6 and gradation signal lines 7: 2000(pF)=C1+ . . . +C10

(coupling area to the main reference signal line 6: 0.5 mm×80 $\mu$m; distance between electrodes: 4.5 $\mu$m; dielectric constant of a dielectric (liquid crystal) between electrodes: 8×8.854 pF/m with about 3000 gradation signal lines)

FIG. 6A is a view showing a simulation model without any reference signal transfer. FIG. 6B is a view showing a simulation model with a reference signal transfer at one point. FIG. 6C is a view showing a simulation model with reference signal transfers at two points. To VBase on the left side of FIGS. 6A to 6C is inputted a reference signal, which is a pulse signal of rectangular wave which rises from 0 V to 5 V and falls to 0 V 20 $\mu$s later.

FIG. 7 is a view showing simulation results, in which lines (a), (b), and (c) correspond to FIGS. 6A, 6B and 6C, respectively. Further line (d) shows a result of another simulation in which the reference signal transfer is carried out at ten points. It is found from the results that the signal delay can be reduced largely by transferring the reference signal.

Figure 8:
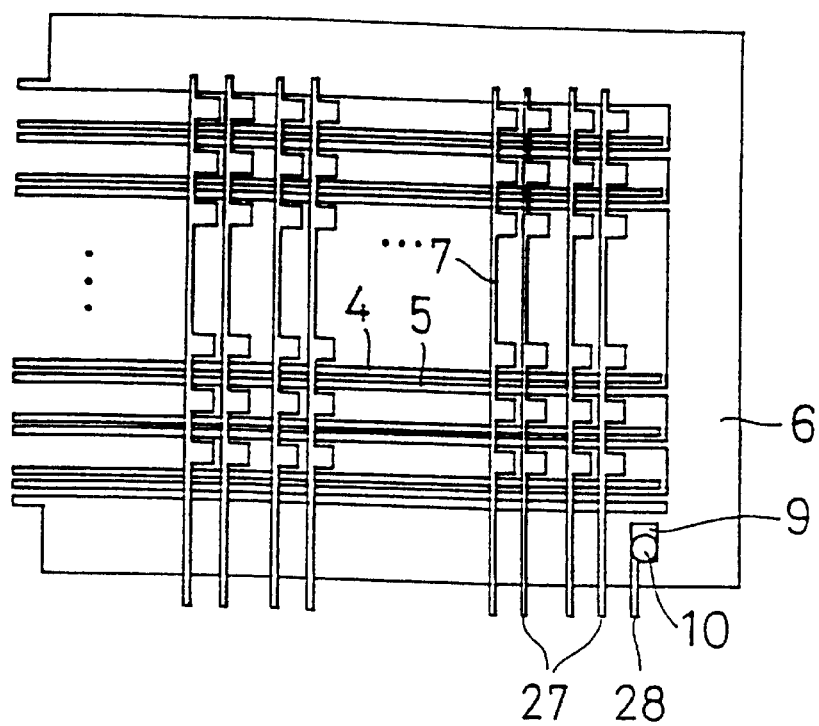
FIG. 8 is a schematic plan view of a signal line arrangement of the liquid crystal display apparatus of the embodiment of FIG. 1.

FIG. 8 is a plan view of a signal line arrangement of the liquid crystal display apparatus of the embodiment. On a side which is close to the input side of the gradation lines 7, the reference signal transfer pad 9 is provided on the main reference signal line 6 at one point, and the reference signal is inputted from the counter substrate part side to the pixel substrate part side via the conductive material 10. In such a structure, the main reference signal line 6, which is shown in the upper, lower, and right sides of the image display region in FIG. 8, is formed so as to have a larger width than that of the reference signal line 5 in the image display region. By making the main reference signal line 6 broad, the resistance value of the main reference signal line 6 is reduced, and by direct input from the reference signal transfer pad 9, adverse effects of capacitance components formed between the main reference signal line 6 and the gradation signal lines 7, on the signal delay, is also reduced to decrease a signal delay which occurs in the main reference signal line 6.

Moreover, since the main reference signal line 6 can be made broad, the reference signal transfer pad 9 can be formed to have a large area. As a result, it is possible to reduce the contact resistance against the conductive material 10. When the contact resistance is high, the signal delay reduction effect of the reference signal transfer is lowered, so that the effect of the structure which can reduce the contact resistance is important.

Additionally, shield of light in the upper, lower, and right sides of an periphery of the image display region is carried out by a wide metal film instead of an insulating material such as a resin, and therefore it is possible to prevent any leakage of light from the periphery with the result that display quality is improved.

In the respective embodiments of the invention, in an end portion of the counter substrate is disposed a reference input terminal 28 pulled out from the reference signal transfer pad 9 so as to form a line with a gradation input terminal 27 for inputting a gradation signal to the gradation signal line 7. The reference signal is inputted from a control substrate to the reference input terminal 28 with little signal delay. The reference signal is transmitted to the reference signal line 5 of the pixel substrate part with little signal delay, and it is accordingly possible to decrease the reference signal delay and to display images with high quality. Also, an input terminal for inputting the reference signal is also provided on the side of a terminal of the scanning line 4 for inputting a scanning signal. Such input terminal is also provided in the following embodiments.

Figure 9:
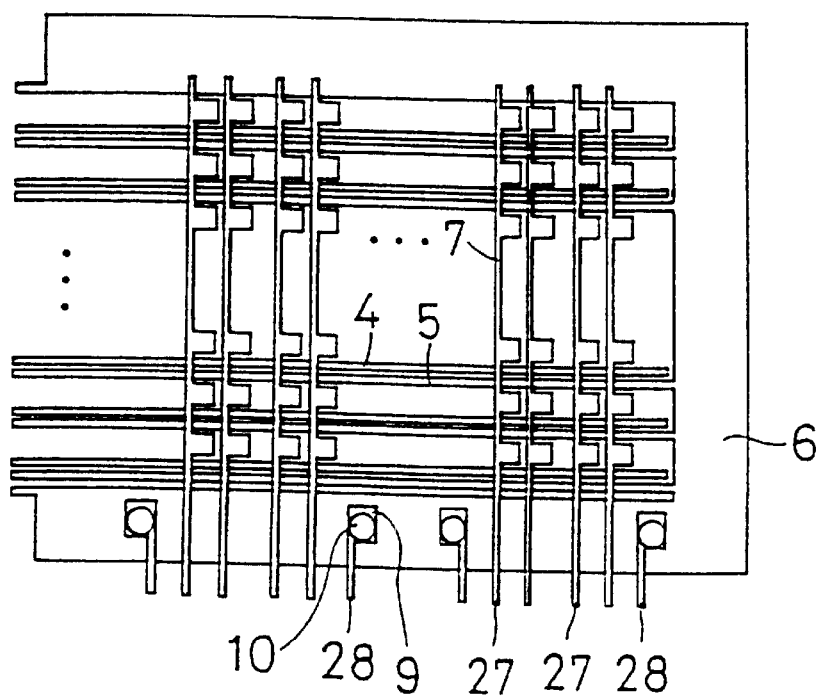
FIG. 9 is a schematic plan view of a signal line arrangement of the liquid crystal display apparatus of a second embodiment of the invention.

FIG. 9 is a view showing a signal line arrangement of a liquid crystal display apparatus of a second embodiment. In the embodiment, on the basis of simulation results of FIGS. 6 and 7, a plurality of the reference signal transfer pads 9 and the reference input terminals 28 are arranged to make electrical connections to the main reference signal line 6 by the conductive material 10 at a plurality of points, whereby the signal delay reduction effect is further strengthened. Additionally, since the electrical connections are made at the plurality of points, such a redundancy is achieved that even if a poor connection occurs at any one of the points, display can be continued by electrical connections at the rest points, with the result that reliability is further enhanced.

Figure 10:
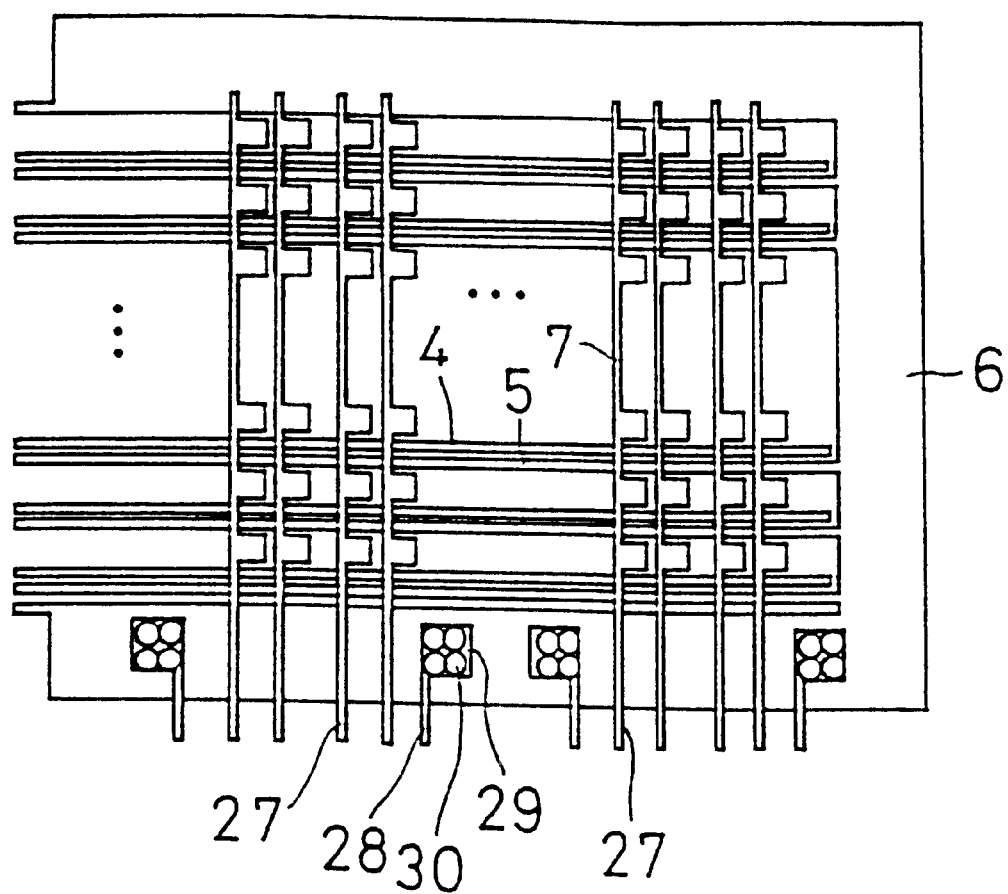
FIG. 10 is a schematic plan view of a signal line arrangement of the liquid crystal display apparatus of a third embodiment of the invention.

FIG. 10 is a view showing a signal line arrangement of a liquid crystal display apparatus of a third embodiment. In the embodiment, a plurality of pieces of conductive material 30 are arranged per reference signal transfer pad 29, increase of contact resistance, which is caused by a contact failure between the reference signal transfer pad 29 and the main reference signal line 6, is prevented, and a redundant structure is achieved which contributes to preventing degradation of display quality.

Figure 11A:
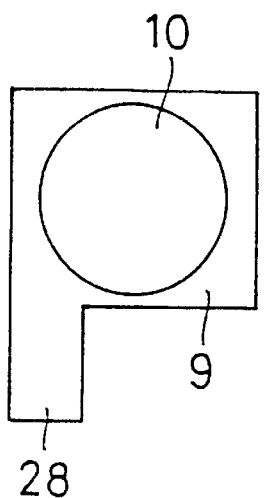
FIGS. 11A to 11C are partial plan views showing arrangements of a reference signal transfer pad and conductive material in embodiments of the invention.
Figure 11B:
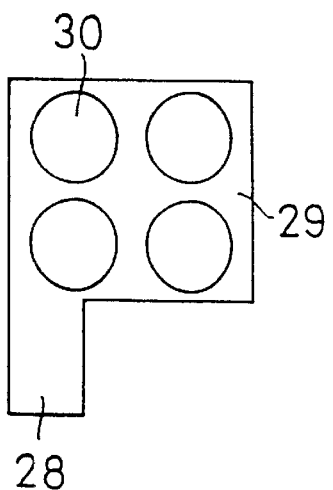
Figure 11C:
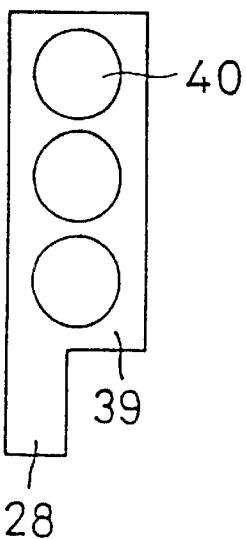

FIGS. 11A to 11C are views showing examples related to the arrangement of the reference signal transfer pad and conductive material. FIG. 11A is a view showing an example of an arrangement in which the conductive material 10 is disposed at one point per reference signal transfer pad 9. This arrangement, which corresponds to the first and second embodiments, has an advantage of good productivity because of its simple structure. FIG. 11B is a view showing an example of an arrangement in which the conductive material 30 is disposed at four points per reference signal transfer pad 29. This arrangement corresponds to the third embodiment. FIG. 11C is a view showing an example of an arrangement in which the conductive material 40 is disposed at three points per reference signal transfer pad 39. In this arrangement, even when a part where contacts are formed has a narrow width, it is possible to form contacts at a plurality of points by arranging the pieces of conductive material 40 in a line. The number of points where the conductive material 30, 40 is disposed, in FIGS. 11B and 11C are not limited to four or three points, any number of points is acceptable, as far as contacts are formed at a plurality of points and a redundant structure can be achieved. In the following embodiments, the conductive material at one point may be also divided into many pieces.

Figure 12:
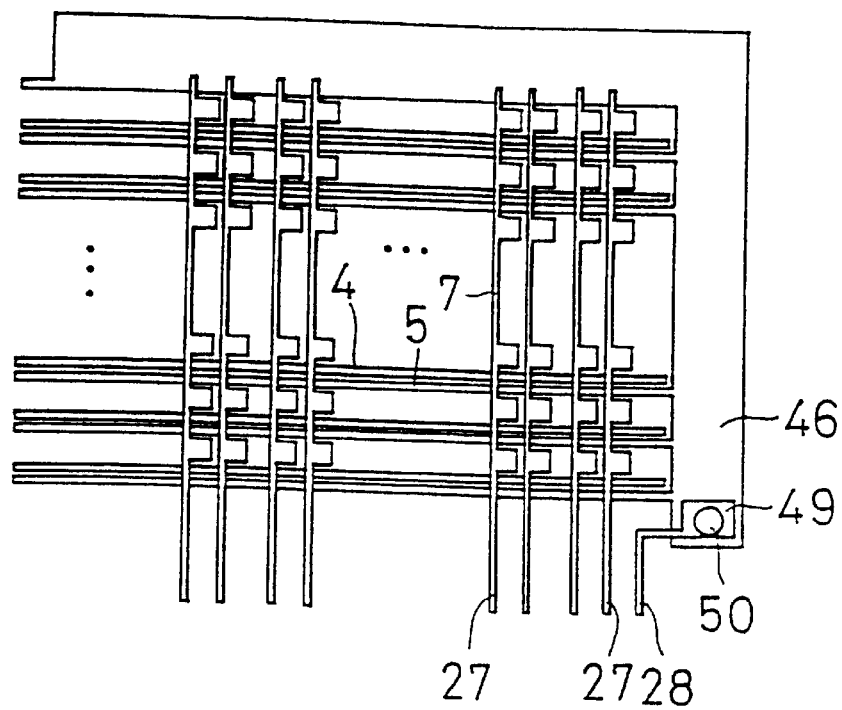
FIG. 12 is a schematic plan view of a signal line arrangement of the liquid crystal display apparatus of a fourth embodiment of the invention.

FIG. 12 is a view showing a signal line arrangement of a liquid crystal display apparatus of a fourth embodiment. In the embodiment, a main reference signal line 46 is formed in upper and right peripheral portions of the image display region. A reference signal transfer pad 49 is provided in a portion opposite to the main reference signal line 46, and the reference signal is inputted from the counter substrate side via conductive material 50. In this structure, the main reference signal line 46 does not exist in a lower portion of the image forming region in FIG. 12, therefore a capacitance coupling, which occurs in the intersection part between the main reference signal line 46 and the gradation signal lines 7, decreases, and the signal delay can be reduced. Further, outside the image display region as a liquid crystal display panel, namely in a lower portion in FIG. 12, the main reference signal line 46 does not exist, so that the panel shape can be made smaller. Moreover, even if the main reference signal line 46 exists in a lower portion of the panel, in the case where the main reference signal line is thin, the same effects are obtained as in the case where the main reference signal line do not exist.

Figure 13:
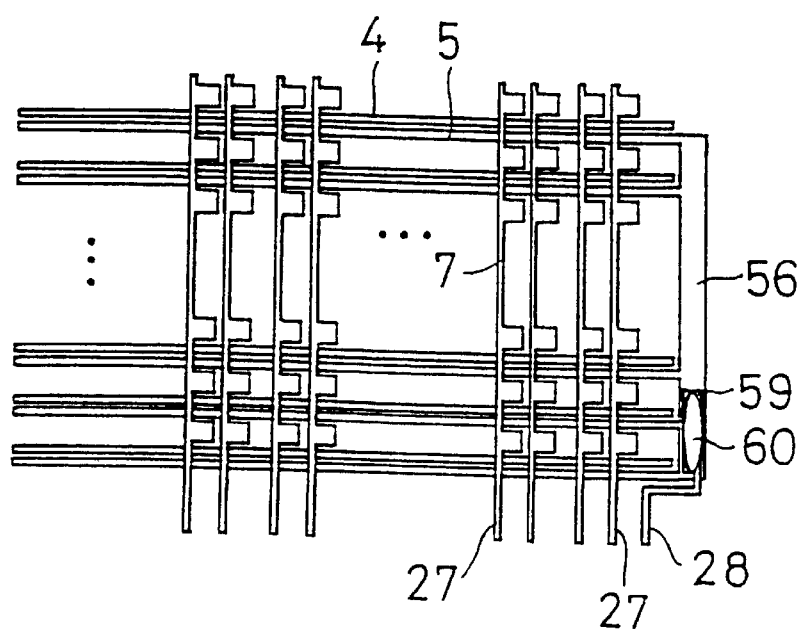
FIG. 13 is a schematic plan view of a signal line arrangement of the liquid crystal display apparatus of a fifth embodiment of the invention.

FIG. 13 is a view showing a signal line arrangement of a liquid crystal display apparatus of a fifth embodiment. In the embodiment, a main reference signal line 56 is formed only on a side where the scanning signal is not inputted to the scanning line 4 and is not formed in upper and lower portions of FIG. 13 or is formed narrow in these portions. In upper and lower portions of the panel, there is no intersection part between the main reference signal line 56 and the gradation signal lines 7, the capacitance coupling can be eliminated, and the signal delay can be more reduced than that of the fourth embodiment in FIG. 12. Even when the main reference signal line 56 is formed narrow in the upper and lower portions, the same effects can be also obtained. Since the main reference signal line 56 does not exist or is formed narrow in the upper and lower portions of the panel, the panel can be produced smaller than that of the fourth embodiment.

Figure 14:
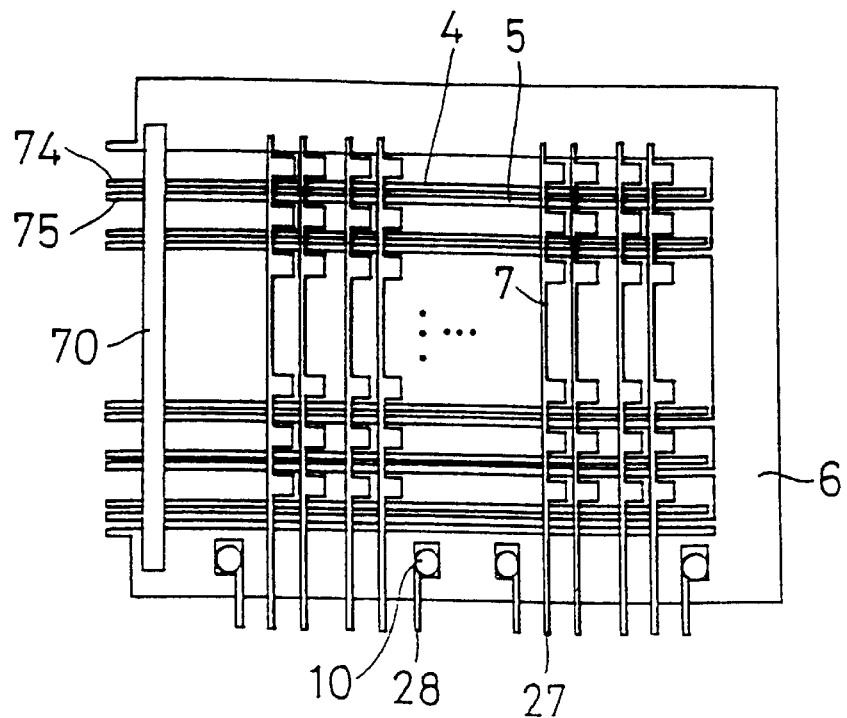
FIG. 14 is a schematic plan view of a signal line arrangement of the liquid crystal display apparatus in a sixth embodiment of the invention.

FIG. 14 is a view showing a signal line arrangement of a liquid crystal display apparatus of a sixth embodiment. In the embodiment, the main reference signal line 6 is formed in a peripheral portion of the substrate except for a scanning signal input side portion to the scanning line 4, namely, formed on upper, lower, and right sides of an image display region of FIG. 14. On the left side of FIG. 14, portions of the main reference signal line 6 are connected by a connecting line 70 and are electrically connected. In connection with the pixel substrate part, the scanning lines 4, the reference signal lines 5 and the main reference signal line 6 are formed as the same layer, and the connecting line 70 is formed as a different layer by a conductive film. With the structure, reference input terminals 75 on the side of scanning input terminals 74 for inputting the scanning signals to the scanning lines 4, do not have to correspond to the reference signal line 5 one to one, with the result that a simple design is achieved. In the structure, the connecting line 70 can be formed, for example, in forming pixel electrodes, by a patterning process, which is realized by only adding a connecting line forming pattern to a conventional pixel electrode forming pattern. Accordingly the number of processes is not increased and an increase of costs is avoided.

Figure 15:
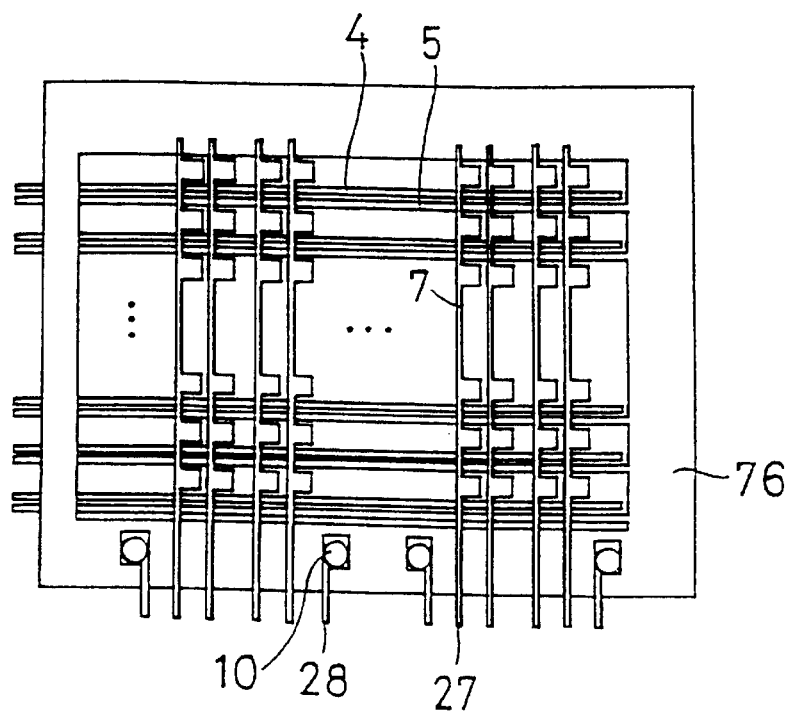
FIG. 15 is a schematic plan view of a signal line arrangement of the liquid crystal display apparatus in a seventh embodiment of the invention.

FIG. 15 is a view showing a signal line arrangement of a liquid crystal display apparatus of a seventh embodiment. In the embodiment, on the pixel substrate, scanning lines 4 and the reference signal lines 5, and a main reference signal line 76 are disposed in different layers. As shown in the sixth embodiment in FIG. 14, the contact resistance which is caused in connecting the main reference signal line 6 and the connecting line 70 which are disposed in different layers as shown in the sixth embodiment of FIG. 14, can be eliminated, and accordingly the resistance of a reference signal line including the reference signal lines 5 and the main reference signal line 76, is reduced, with the result that the signal delay can be decreased in comparison with the sixth embodiment. When the reference signal is inputted from the reference input terminal 28 to the reference signal lines 5 via the reference signal transfer pad, the signal delay can be more reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
   a pixel substrate;
   a counter substrate disposed opposite to the pixel substrate; and
   a liquid crystal layer sandwiched therebetween, the pixel substrate comprising thereon:
   a plurality of switching elements provided with a control terminal and first and second controlled terminals, a conductive state between the first and second controlled terminals, being controlled according to a signal inputted to the control terminal, the plurality of switching elements being arranged in a matrix form;

a plurality of scanning lines for connecting the control terminals of the respective switching elements for each row thereof;

a plurality of reference signal lines for connect the first controlled terminals of the switching elements for each row thereof; and a plurality of pixel electrodes which are connected to the second controlled terminals of the switching elements, the counter substrate comprising thereon:

a plurality of counter electrodes, which are disposed opposite to respective pixel electrodes; and a plurality of signal lines for connecting the counter electrodes for each column thereof, the liquid crystal display apparatus further comprising:

a pixel side connecting region which is formed on the pixel substrate and is connected to the plurality of reference signal lines;

a counter side connecting region which is formed on the counter substrate so as to oppose to the pixel side connecting region; and conductive material for electrically connecting between the pixel side connecting region and the counter side connecting region.

2. The liquid crystal display apparatus of claim 1, wherein the pixel substrate comprises a main reference signal line for connecting the plurality of reference signal lines, disposed outside a region where the plurality of pixel electrodes are arranged, and the pixel side connecting region is formed on the main reference signal line.

3. The liquid crystal display apparatus of claim 1, wherein a combination of the pixel side connecting region, the counter side connecting region and the conductive material is formed at a plurality of points.

4. The liquid crystal display apparatus of claim 1, wherein a plurality of pieces of the conductive material are arranged for a single combination of the pixel side connecting region and the counter side connecting region.

5. The liquid crystal display apparatus of claim 1, further comprising a control substrate, which is connected to the counter side connecting region, for inputting the reference signal to the reference signal lines via the conductive material and the pixel side connecting region.

* * * * *